(12) United States Patent  (10) Patent No.: US 6,957,815 B1
Inciong  (45) Date of Patent: Oct. 25, 2005

(54) MLS GASKET WITH EPOXY BEAD STOPPER LAYER

(75) Inventor: Josefino T. Inciong, Skokie, IL (US)

(73) Assignee: Dana Corporation, Toledo, OH (US)

( * ) Notice: Subject to any disclaimer, the term of this patent is extended or adjusted under 35 U.S.C. 154(b) by 148 days.

(21) Appl. No.: 10/128,371

(22) Filed: Apr. 23, 2002

(51) Int. Cl.[7] ............................................. F02F 11/00
(52) U.S. Cl. ...................................... 277/593; 277/594
(58) Field of Search .................................... 277/592–5

(56) References Cited

U.S. PATENT DOCUMENTS

| | | | | |
|---|---|---|---|---|
| 3,794,333 A | * | 2/1974 | Czernik et al. | ............... 277/593 |
| 4,834,399 A | * | 5/1989 | Udagawa et al. | ............ 277/592 |
| 5,879,011 A | | 3/1999 | Takata et al. | |
| 5,938,208 A | * | 8/1999 | Yoshida et al. | .............. 277/592 |
| 5,951,021 A | | 9/1999 | Ueta | |
| 6,113,110 A | * | 9/2000 | Hasegawa | ..................... 277/593 |
| 6,145,847 A | * | 11/2000 | Maeda et al. | ................. 277/593 |
| 6,206,381 B1 | * | 3/2001 | Ii et al. | ......................... 277/593 |
| 6,318,733 B1 | * | 11/2001 | Udagawa | ..................... 277/596 |
| 6,336,639 B1 | * | 1/2002 | Ishida et al. | ................. 277/594 |

* cited by examiner

*Primary Examiner*—Alison K. Pickard
(74) *Attorney, Agent, or Firm*—Rader, Fishman & Grauer PLLC

(57) ABSTRACT

A multi-layer steel (MLS) cylinder head gasket includes a unitary stopper layer interposed between mirror image beaded outer layers. A stopper ring situated about the boundary of a combustion opening on the stopper layer is formed by folding over the boundary edge of the stopper layer material. The stopper ring pre-stresses the gasket interface about the combustion opening during securement of a cylinder head to an engine block. The stopper layer includes at least one raised epoxy bead structure, circumferentially and closely surrounding the outside edge of the stopper ring. The epoxy bead acts to spread load, and hence to avoid point loads at the combustion aperture boundary. The epoxy bead is applied to the gasket by screen-printing, and may incorporate a powdered metal for limiting bead resiliency. The bead height is greater than the thickness of the stopper ring, to reduce risk of splitting the stopper layer material.

11 Claims, 1 Drawing Sheet

MLS GASKET WITH EPOXY BEAD STOPPER LAYER

BACKGROUND OF THE INVENTION

1. Field of the Invention

The present invention relates to improvements in MLS cylinder head gaskets for automotive internal combustion engines. More particularly, the invention relates to gaskets having improved stopper layers to provide enhanced sealing about their combustion apertures.

2. Description of the Prior Art

Those skilled in the art will appreciate the difficulty involved in maintaining a high quality seal between cylinder apertures of an internal combustion engine and a cylinder head fastened to engine block. In recent years, multiple-layered steel (MLS) cylinder head gaskets have become a preferred design choice, wherein all (typically at least three) gasket layers have been formed of steel. Beaded exterior layers have generally been fabricated of a 301 stainless steel, a relatively robust metal with a commensurately high spring rate, for meeting requisite performance requirements over the useful life of the gaskets. The center layer, also called a "spacer" layer, has generally been formed of less expensive metals such as 409 stainless steel, or in some cases even zinc-plated, and other low carbon steels, for meeting less rigorous requirements.

The gasket areas immediately adjacent the circumference of engine cylinder bore apertures are subject to considerably greater stresses for assuring proper sealing than areas of the gasket radially remote from the apertures. To meet the greater stress requirements at the aperture areas, so-called stopper layers have been employed in areas that circumferentially surround each cylinder aperture boundary. The stopper layers are designed to provide increased sealing pressures around areas immediately adjacent the combustion apertures. In some cases the stoppers have been formed of extra layers of metal, consisting either of layers folded over or under primary sealing layers. In other cases, the stoppers have been formed as layers separately provided, e.g., discrete annular rings positioned about the aperture boundaries.

Radially outwardly of the stopper layer, a secondary seal is normally provided. The secondary seal is usually formed as an active spring seal defined by an embossed bead in a primary external metal sealing layer. Two of such embossed beads are normally provided in two separate mirror image external layers that sandwich the center or spacer layer. In some cases, the embossed beads employed in such duplicate mirror image primary sealing layers have been prone to cracking at the boundaries of the beads, particularly where hard metal stopper layers have been employed. The stopper layer dynamics can create stresses on the beads that exceed normal bead deflection stress capability. Resultant cold working and bead cracking are issues seriously detrimental to both the performance and longevity of gaskets that otherwise provide reliable combustion gas sealing media.

To the extent that trends in the design of MLS gaskets have been toward reductions in numbers of layers used, and particularly in cases where such layers cannot feasibly be reduced, non-metallic stoppers have been employed. Such non-metallic stopper structures have generally been formed as part of, and hence integral to, a central unitary metal spacer layer. Many have been employed in combination with metallic bead structures, often deposited by screen-printing in the troughs or undersides of such beads. The employment of screen-printed, non-metallic beads has, however, been associated with higher expense, and in many cases with less than satisfactory results.

SUMMARY OF THE INVENTION

The disclosed invention provides a unitary, non-metallic circular stopper bead that circumferentially extends about a combustion aperture of an MLS combustion-sealing gasket. The circumferential non-metallic bead offers a potentially more durable, as well as simpler manufactured, gasket.

In one described embodiment, a multi-layer steel (MLS) cylinder head gasket is defined by a multi-layered steel body that includes a unitary metallic stopper layer interposed between mirror image beaded outer layers. The interposed stopper layer has an asymmetrically formed bead defining at least one raised epoxy bead structure that circumferentially and closely surrounds a combustion aperture. The epoxy bead acts a load bearing spreader for the cylinder head gasket, thus assuring that point loads of the type associated with high stresses are avoided.

The MLS gasket includes metallic upper and lower sealing layers with a single metallic intermediate stopper layer interposed between the upper and lower layers. All of the layers contain a combustion opening, wherein each opening of each layer is matingly aligned with openings of the others in sandwiched fashion. The opening of the stopper layer defines a boundary formed by folding over an extended edge of the stopper layer to create a so-called fold-over stopper ring. The ring is adapted to create a high stress, and acts as a load-bearing component to create a pre-stressing of the cylinder head at the aperture boundary during the bolting of the cylinder head to the engine block.

In the disclosed invention, the load bearing area is enhanced, and hence improved, by screen-printing a bead of a powdered metal filled epoxy on a surface of the stopper layer immediately adjacent the outside edge of the stopper ring. The bead has a height greater than the stopper ring thickness, which reduces the risk of the stopper layer material splitting during the folding process or during the active combustion cycle. In this manner, the overlap dimension may be optimized.

The thickness of the epoxy resin stopper beads is controlled by means of a silk-screening or screen-printing process. As disclosed, the composite metallic stopper bead and resin bead structures range in height from 0.08 to 0.16 mm.

Finally, an embossed metallic secondary bead is formed radially outwardly of the already described primary stopper layer. The primary and secondary beads are designed to act in concert with each other, wherein the secondary sealing bead provides a backup in case of failure of the primary bead, as well as providing a primary seal against leakage of engine oil or coolant into the combustion chambers of the engine.

A DETAILED DESCRIPTION OF THE EMBODIMENTS

Figure 1:
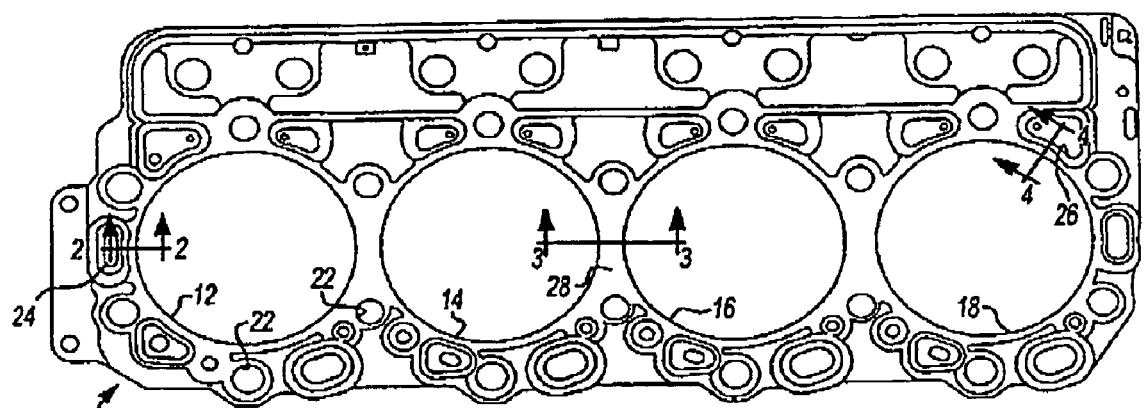
FIG. 1 is a plan view of a one described embodiment of an MLS cylinder head gasket adapted to surround and seal a plurality of engine cylinder bore apertures.

Referring initially to FIG. 1, a metal cylinder head gasket 10 is shown. In the described embodiment, the gasket 10 includes a plurality of layers of steel, and is generally referred to as a multi-layered steel (MLS) gasket, although other metals may be used in some environments.

In sealing between engine blocks and cylinder heads, a variety of variables impact the design of a gasket. The engine areas and surfaces to be sealed are rarely uniform in size or shape. In addition, the attachment bolt locations are generally non-symmetrically arranged or positioned about the areas of the gasket to be secured. Against the backdrop of this asymmetrical environment, the cylinder bores must be sealed tightly at their boundary edges in order to provide satisfactory performance.

Figure 2:
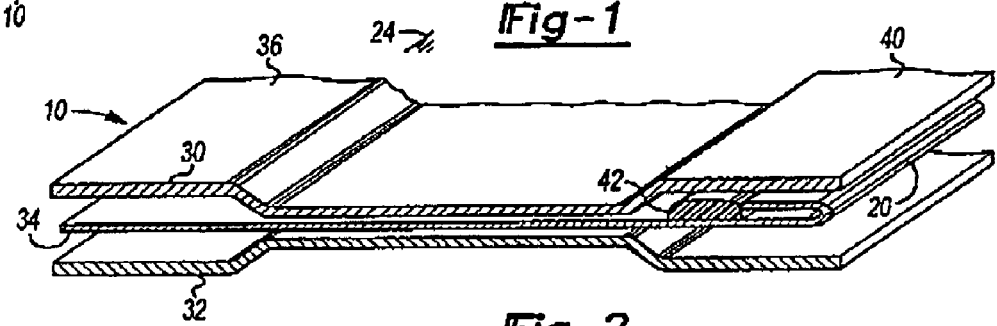
FIG. 2 is a cross-sectional view of the gasket of FIG. 1, taken along lines 2—2 of FIG. 1.
Figure 3:
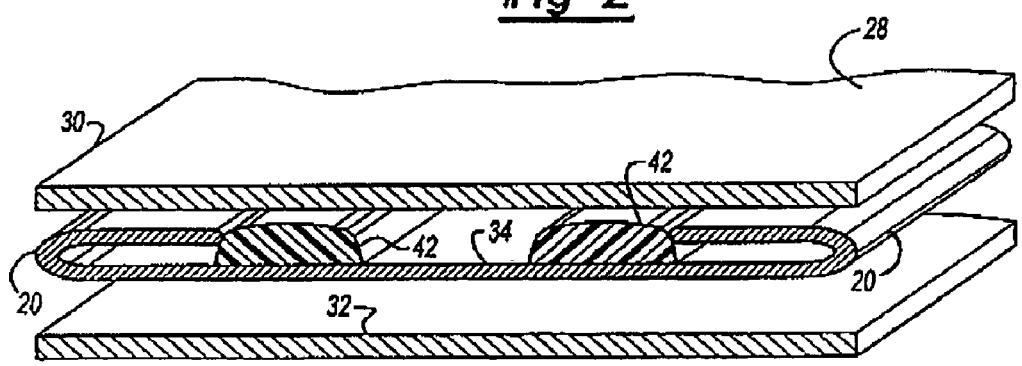
FIG. 3 is a cross-sectional view of the gasket of FIG. 1, taken along lines 3—3 of FIG. 1.
Figure 4:
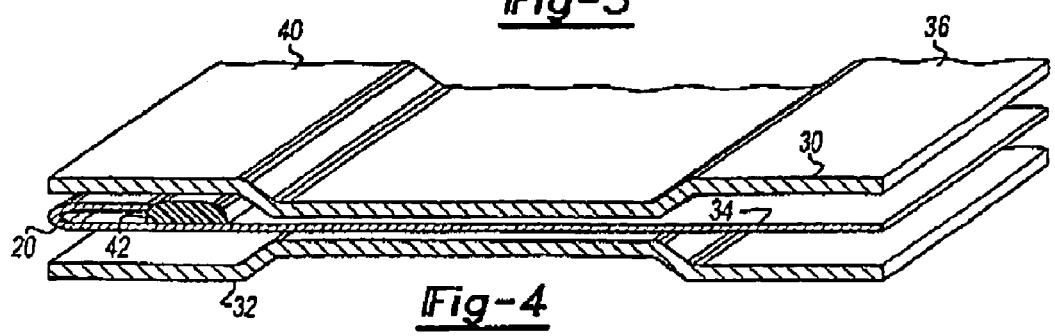
FIG. 4 is a cross-sectional view of the gasket of FIG. 1, taken along lines 4—4 of FIG. 1.

As a result of the described asymmetrical relationships, and referring to FIGS. 2, 3, and 4, it is preferable that a stopper layer be provided at each cylinder bore boundary of the cylinder head gasket 10 to provide a high sealing stress or pressure about the circumference of each of the cylinder bore apertures 12, 14, 16 and 18. This invention provides an improved mechanism for assuring that pressure is applied via the stopper layer in a manner that is both efficacious with respect to manufacturing, as well as in a manner designed to avoid premature failure of metallic stopper beads.

The gasket 10 includes a plurality of apertures in addition to the cylinder bore apertures 12, 14, 16, and 18. Thus, bolt apertures 22 are adapted to secure the gasket in place between an engine bore and a cylinder head (neither shown). Several additional apertures shown comprise coolant (water bore) apertures 24 (view 2—2 of FIG. 2), and oil apertures 26 (view 4—4 of FIG. 4), as will be appreciated by those skilled in the art. Various unnumbered apertures including bypass gas apertures are also included, though the latter are not displayed in cross-section in the present invention.

A web area 28 of the gasket 10 (FIG. 3) is situated between two bore apertures 14 and 16 (FIG. 1). The area 28 represents an area in which a relatively wide spacing between bolt apertures 22, coupled with a relatively small area dimension, gives rise to traditionally difficult sealing. Thus, it will be appreciated that desired stopper layer forces may be enhanced in the web area 28 about the cylinder head aperture boundaries 14 and 16. This is achieved by providing a fold-over stopper bead 20 in the web area 28 in between the apertures. The fold-over stopper bead 20 thicknesses are generally established by design parameters calculated through finite element analysis for cylinder bore areas of any given cylinder head gasket.

Referring to FIG. 2, a cross-sectional view of the gasket 10 is revealed along lines 2—2 of FIG. 1. The gasket 10 is comprised of two external layers; a top or upper embossed layer 30, and a mirror image lower or bottom embossed layer 32. Interposed between the external layers 30 and 32 is an embossed center or spacer layer 34. The top and bottom embossed layers 30, 32 contain an asymmetrical metal stopper bead 40. The bead 40 in the described embodiment is a metal bead 40 having a cross-section in the general shape of a trapezoid. Thus, the bead 40 is shaped as an inverted trough. An epoxy resin stopper bead 42 is deposited and cured on the stopper layer 34 adjacent the fold-over stopper 20. Together, the resin bead 42 and the metallic bead 40 act as the stopper that circumferentially surrounds the bores 12, 14, 16, 18.

Those skilled in the art will appreciate that a secondary metallic bead 36 provides a backup to the metallic bead 40, as well as a means for preventing engine coolant flow toward the metallic bead 40.

Referring back to FIG. 3, the center or spacer layer 34 is shown apart from the top and bottom layers 30, 32. The layer 34 includes the described fold-over stopper 20, which interfaces with the top and bottom embossed layers 30, 32 to provide adequate stopper support for the web area 28. In the described embodiment, the metallic beads 36, 40 (FIGS. 2 and 4) are formed only in the top and bottom layers 30, 32. Comparing FIGS. 2, 3 and 4, those skilled in the art will appreciate that the metallic beads 36, 40 do not exist in all views. It will further be appreciated that the depth of the bead 40 (FIG. 4) is about 0.16 mm. The portions of top and bottom layers 30, 32 adapted to cover the web area 28 represent areas without beads (see FIG. 3).

The epoxy resin sealing bead material 42 is deposited on the spacer layer 34 immediately adjacent the edge of fold-over stopper 20, so as to substantially define a double thickness layer. Together, the composite metallic bead 40 and epoxy resin sealing bead 42 form an asymmetric composite bead structure, as shown. To the extent that the bead 40 acts in concert with the resin bead 42, it will be apparent to those skilled in the art that the epoxy bead 42 may be situated so as to be immediately juxtaposed against the edge of fold-over-stopper 20. The epoxy bead 42 may be successfully applied by silk-screening to a predetermined height. Upon completion of silk-screening, the resin is heat-cured, and hardens during the curing. The hardened resin will have a slightly convex meniscus over its exposed top surface; thus, it will have a crescent-shaped cross-section at the portion thereof adapted for making contact with the top layer 30 of the gasket. The height of the resin bead 42 is greater than the thickness of the fold-over stopper 20 to reduce risk of splitting the stopper layer material during the useful life of the gasket. The resin may incorporate a powered metal for controlling bead consistency, and even for limiting resiliency.

With respect to operation in concert of the composite metallic bead 40 and resin bead 42, the resin bead 42 will tend to collapse until the level of the top surface of the epoxy is reached or contacted by the as vertically collapsible adjacent metallic bead 40 of layer 30. To the extent that the movement of layers in a combustion gasket 10 is dynamic, it will be appreciated that successive cycles of deflection of the stopper beads 30, 40 may possibly otherwise give rise to bead cracking over relatively short periods of time. Hence by fortifying the operation of the metallic bead 40 with the epoxy bead 42, the present inventors have discovered a way to avoid early stopper bead failures, and thus achieve a viable stopper layer that acts to spread load, and hence to avoid point loads at combustion aperture boundaries.

Finally, in the described embodiment, the metal employed for the top and bottom layers 30, 32 of the gasket 10 is 301 SAE stainless steel. The spacer layer 34 is formed of 409 stainless or zinc plated low carbon steel.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

I claim:

1. A multi-layer gasket comprising:
   a stopper layer having first and second substantially parallel surfaces, and at least one aperture extending between the first and second surfaces, the aperture bounded by a folded-over portion of the stopper layer extending onto the first surface of the stopper layer;
   a sealing layer facing the first surface of the stopper layer; and
   a non-metallic bead applied to the first surface of the stopper layer adjacent an outside edge of the folded-over portion of the stopper layer, said non-metallic bead having a height greater than the thickness of the folded-over portion of the stopper layer, wherein said bead is formed of a non-elastomeric material; and, wherein said layers are metal, and the sealing layer facing said first surface contains a metal bead, and at least a portion of said metal bead overlaps said non-metallic bead and said folded-over portion. .

2. The multi-layer gasket of claim 1, wherein the sealing layer facing said first surface does not directly contact said edge.

3. The multi-layer gasket of claim 2, wherein the bead is in direct contact with said edge.

4. The multi-layer gasket of claim 1, wherein said gasket comprises two of said sealing layers, wherein said second sealing layer faces the second surface of said stopper layer.

5. The multi-layer gasket of claim 4, wherein said sealing layer facing said second surface contains a metal bead.

6. The multi-layer gasket of claim 5, wherein said non-metallic bead comprises an epoxy resin material, and wherein further said non-metallic bead comprises at least one asymmetrical stopper portion of said gasket.

7. The gasket of claim 6 wherein at least one of said layers comprises a stainless steel material.

8. The multi-layer gasket of claim 6, wherein said non-metallic bead has a convex meniscus-shaped top surface portion adapted for contact with said first layer.

9. The cylinder head gasket of claim 8, wherein said non-metallic bead comprises a load-bearing mechanism to avoid cracking of the folded-over portion of the stopper layer.

10. The cylinder head gasket of claim 9 wherein said combination metallic bead and resin material structures comprise an asymmetrical circular bead, said bead extending about said at least one aperture.

11. The gasket of claim 8 wherein said sealing layers comprise an embossed secondary bead circumferentially positioned radially outwardly of said stopper.

* * * * *